(12) United States Patent
Wolff

(10) Patent No.: US 7,908,837 B2
(45) Date of Patent: Mar. 22, 2011

(54) GRASS COLLECTOR MOUNTING SYSTEM

(75) Inventor: Kermit A. Wolff, Lincoln, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 117 days.

(21) Appl. No.: 12/151,588

(22) Filed: May 7, 2008

(65) Prior Publication Data

US 2009/0277143 A1    Nov. 12, 2009

(51) Int. Cl.
*A01D 43/06*    (2006.01)

(52) U.S. Cl. .......................................................... 56/202

(58) Field of Classification Search .............. 56/5, 15.9, 56/194, 199, 320.1, DIG. 9, DIG. 14, 16.6, 56/200, 202–206; 224/280, 410, 488, 511, 224/519, 507; 248/674
See application file for complete search history.

(56) References Cited

U.S. PATENT DOCUMENTS

| | | | | |
|---|---|---|---|---|
| 2,191,601 A * | 2/1940 | Wessock | ...................... | 24/600.9 |
| 2,851,844 A * | 9/1958 | Bailey | .............................. | 56/202 |
| 3,099,122 A * | 7/1963 | Sakatani | ......................... | 56/199 |
| 3,410,008 A * | 11/1968 | Standfuss | ....................... | 37/231 |
| 3,964,622 A * | 6/1976 | Blair et al. | ..................... | 414/723 |
| 3,985,249 A * | 10/1976 | Aker et al. | ..................... | 414/723 |
| 4,106,645 A * | 8/1978 | Janish | ........................... | 414/723 |
| 4,532,756 A * | 8/1985 | Merkel | ........................... | 56/202 |
| 4,986,722 A * | 1/1991 | Kaczmarczyk et al. | ....... | 414/723 |
| 5,078,569 A * | 1/1992 | Cook | ............................. | 414/723 |
| 5,224,816 A * | 7/1993 | Kaczmarczyk et al. | ....... | 414/723 |
| 6,341,478 B1 * | 1/2002 | Sallstrom et al. | .................... | 56/7 |
| 6,557,333 B2 * | 5/2003 | Swart et al. | ..................... | 56/16.6 |
| 6,709,224 B2 * | 3/2004 | Heiple | ........................... | 414/723 |
| 6,729,431 B2 * | 5/2004 | Osuga et al. | ................... | 180/312 |
| 7,086,821 B1 * | 8/2006 | Reicks | ........................... | 414/723 |
| 7,219,489 B2 * | 5/2007 | Tada et al. | ......................... | 56/202 |
| 7,607,284 B2 * | 10/2009 | Kanai et al. | ...................... | 56/202 |
| 2004/0211803 A1 * | 10/2004 | Powell et al. | .................. | 224/410 |
| 2006/0272308 A1 * | 12/2006 | Moore | ............................ | 56/194 |
| 2007/0221695 A1 * | 9/2007 | Winkler | ......................... | 224/519 |
| 2007/0289172 A1 * | 12/2007 | Bridges | ............................ | 37/403 |
| 2009/0282797 A1 * | 11/2009 | Ogata et al. | ...................... | 56/202 |

* cited by examiner

*Primary Examiner* — Thomas B Will
*Assistant Examiner* — Joan D Misa
(74) *Attorney, Agent, or Firm* — James W. Miller

(57) ABSTRACT

A riding mower carries a grass collector at the rear of the mower frame. A mounting system for the grass collector comprises a mount that pivotally couples the lower portion of the grass collector to the mower frame. The pivotal mount comprises a pair of hooks each of which is inserted onto a pivot rod. In addition, the mounting system comprises a quick connect fastening system that includes a pair of spring biased retaining pins that can be latched in a retracted, non-operative position or unlatched so that the spring bias on the pins is able to move the pins into an extended, operative position. In the extended, operative position of the retaining pins, the pins fasten or secure the grass collector to the mower frame in a substantially upright, operative position of the grass collector.

6 Claims, 7 Drawing Sheets

FIG. I

GRASS COLLECTOR MOUNTING SYSTEM

TECHNICAL FIELD

This invention relates to a mower that carries a grass collector for collecting the grass clippings generated by the operation of the mower. More particularly, this invention relates to the system used to mount the grass collector on the mower.

BACKGROUND OF THE INVENTION

Riding mowers are often used for cutting grass over large areas of ground. Such mowers have a wheeled frame powered by a prime mover, such as an internal combustion engine, carried on the frame. An operator is also carried on the frame on an operator's seat. The operator can control the movement of the frame though various traction drive controls along with some type of steering system. Such riding mowers can more productively and quickly cut large areas of ground than when using a walk behind mower.

Riding mowers as described above often carry a cutting deck that houses multiple cutting blades across the width thereof. These cutting blades rotate about substantially vertical axes in horizontal cutting planes. The cutting blades are staggered relative to one another, or are timed relative to one another, such that the cutting blades collectively cut a single wide swath of grass across the width of the riding mower. When used to cut grass as just described, the multiple cutting blades typically carried on the cutting deck create copious quantities of grass clippings.

There are two fairly common ways of dealing with the grass clippings created by the operation of a riding mower having a multi-bladed cutting deck. One way is to simply discharge the grass clippings onto the surface of the mowed turf where the grass clippings will eventually decompose and act as mulch. The other way is to mount a grass collector on the riding mower and to discharge the grass clippings into the grass collector for collection therein. When the grass collector becomes full, the operator can go to a dump site and dump or remove the grass clippings from the grass collector. The use of a grass collector is often used if the operator wishes the mowed turf to have a neater after cut appearance or at times of the year when the collection of the grass clippings or other debris picked up by the cutting deck, such as leaves, is desirable.

The grass collectors used on riding mowers are adapted to retain a large quantity of grass clippings in keeping with the large quantity of grass clippings that can be generated by the operation of a multi-bladed cutting deck. Usually, the grass collector comprises some type of rigid frame that supports an upper trough or hood that runs across the width of the grass collector. At least one, but typically more than one, container or bag is also carried on the collector frame beneath the hood. Grass clippings generated by the operation of the blades are carried to the hood by a flexible duct or conduit connecting the hood to the cutting deck. The grass clippings laterally flow across the hood with the grass clippings then falling down into the various containers or bags supported beneath the hood. The containers or bags can be removed from beneath the hood in order to dump the grass clippings out of the containers or bags.

Obviously, such a grass collector has substantially more structure than the single grass collector bag used on a walk behind mower. A grass collector of the type described above comprises a rigid frame, a fairly long grass discharge hood at the top of the frame, and usually multiple containers or bags carried on the frame beneath the hood. However, even for such a large and relatively complex grass collector, there is a need for the operator to be able to easily mount or dismount the grass collector from the mower itself. This is due to the fact that there are times when the operator might wish to bag the grass clippings while there may be many other times when the operator wishes to simply discharge the grass clippings onto the surface of the mowed turf. Thus, being able to quickly remove or install the grass collector from the mower is important.

Exmark Manufacturing, Co., the assignee of this invention, currently makes and sells a grass collector that can mount relatively quickly and easily to a riding mower. Basically, the grass collector has a pair of lower pivot links that must be slipped over the ends of a pair of pivot pins on the mower to pivotally connect the grass collector to the mower. The grass collector can then be lifted upwardly with the grass collector pivoting about the pivot pins until the upper portion of the grass collector abuts with the mower. The upper portion of the grass collector must then be pinned on either side to a pair of plates. In one case, these are mounted on either side of the mower as part of the Roll Over Protection System (ROPS). Such a grass collector has been sold for use on the Frontrunner® brand of Exmark mowers.

Despite the fact that the above-described grass collector is easier to mount than many other grass collectors, it still presents certain difficulties. For example, the lower links must be held in place on the pivot pins using hairpins. Similarly, the upper portion of the collector must be pinned to the ROPS plates. This requires that the operator have on hand or be able to find the required pins. In addition to pinning the upper portion of the grass collector to the ROPS plates, the operator must align a hole in the grass collector frame with a hole in the ROPS plates to allow insertion of the connecting pin. This can be difficult to do given manufacturing tolerance variations in the parts or given any sag in the grass collector as the operator attempts to make the required alignment. Thus, a mounting system for a grass collector that would solve or diminish some of these remaining problems is desirable.

SUMMARY OF THE INVENTION

One aspect of this invention relates to a mower, which comprises a mower frame supported for movement over the ground. A grass collector is provided. A mounting system couples the grass collector to the mower frame. The mounting system comprises a pivotal mount that pivotally couples a lower portion of the grass collector to the mower frame and at least one retaining pin that can be selectively latched in a retracted, non-operative position by the operator or selectively unlatched by the operator so that the pin is able to move into an extended, operative position. In the extended, operative position of the retaining pin, the pin fastens or secures the grass collector to the mower frame in a substantially upright, operative position of the grass collector.

Another aspect of this invention relates to an improved riding mower with a grass collector of the type in which the mower has a mower frame, a plurality of wheels for supporting the mower frame for movement over the ground, a cutting deck having at least one rotary blade for cutting grass and generating grass clippings, and a prime mover for powering at least one of the wheels and the cutting blade(s). The grass collector comprises a grass collector frame, an upper hood for receiving grass clippings from the cutting deck, and at least one container or bag carried beneath the upper hood for receiving the grass clippings from the upper hood. A mounting system detachably mounts the grass collector to the mower. The improvement relates to the mounting system and comprises a pivotal mount for pivotally mounting a lower portion of the grass collector on the mower frame. The pivotal mount comprises a hook and pivot arrangement by which the lower portion of the grass collector is hung by at least one hook on a pivot. A quick connect fastening system secures the grass collector to the mower frame in a substantially upright, operative position after the lower portion of the grass collector is first installed on the mower frame using the pivotal mount and after the grass collector is rotated in a first direction around the pivot into the substantially upright, operative position. The quick connect fastening system comprises at least one retaining pin that slides between a retracted, non-operative position and an extended, operative position. The retaining pin in the extended, operative position thereof has a portion thereof positioned adjacent to or abutting against a vertical stop surface on the mower frame to prevent the grass collector from reversely rotating about the pivot out of its substantially upright, operative position, and wherein the vertical stop surface is substantially vertically longer than a vertical height of the adjacent or abutting portion of the retaining pin such that precise vertical alignment of the retaining pin relative to the vertical stop surface is not required.

Yet another aspect of this invention relates to a mower which comprises a mower frame supported for movement over the ground. A grass collector is provided. A mounting system couples the grass collector to the mower frame. The mounting system comprises a pivotal mount that pivotally couples a lower portion of the grass collector to the mower frame. The pivotal mount comprises a hook and pivot arrangement in which a hook hangs from the pivot. The mounting system also comprises at least one retaining pin for securing the grass collector to the mower frame in a substantially upright, operative position after the lower portion of the grass collector is first installed on the mower frame using the pivotal mount and after the grass collector is rotated in a first direction around the pivot into the substantially upright, operative position. The hook is shaped relative to the pivot to permit vertical motion between the grass collector and the mower frame when the grass collector is in the substantially upright, operative position.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
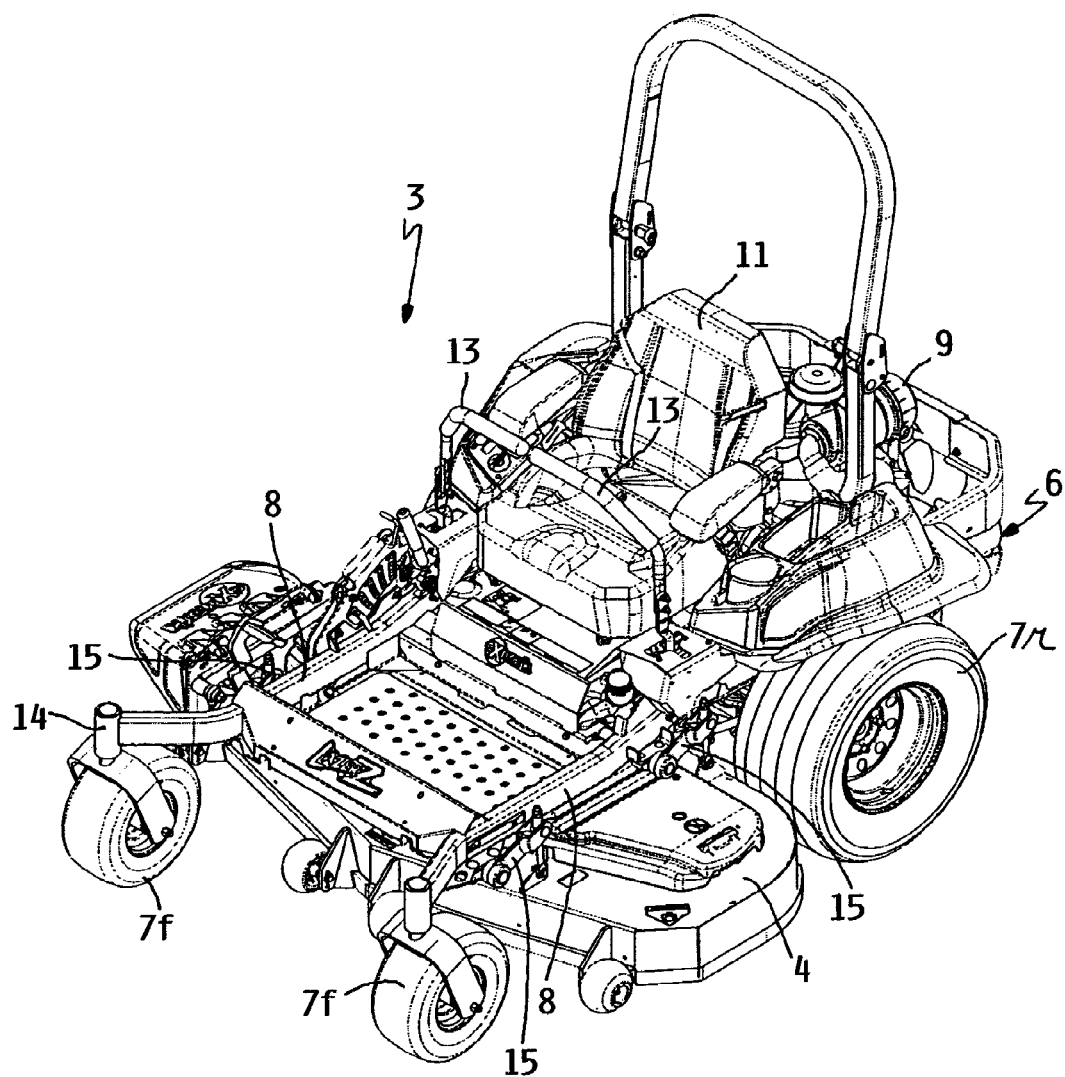
FIG. 1 is perspective view of a mower on which the grass collector mounting system of this invention can be used.

Referring first to FIG. 1, a mower 3 has a frame 6 that supports a rotary cutting deck 4 adjacent the front thereof. Frame 6 is supported for rolling over the ground by a pair of rear drive wheels 7r, only one of which is shown in FIG. 1, and by a pair of front caster wheels 7f. A power source, such as an internal combustion engine 9, is carried at the rear of frame 6. An operator's seat 11 is placed forward of engine 9 and generally between rear drive wheels 7r for carrying a seated operator. Two control levers 13 are used by the operator to control the steering and propulsion provided by rear drive wheels 7r in a manner well known for zero radius turn (ZRT) mowers. Other operational controls are provided for starting and stopping the operation of deck 4. Mower 3 as illustrated herein is similar to, but is not limited to, the Lazer Z mowers manufactured and sold by Exmark Mfg. Co., Inc., the assignee of this invention.

Figure 2:
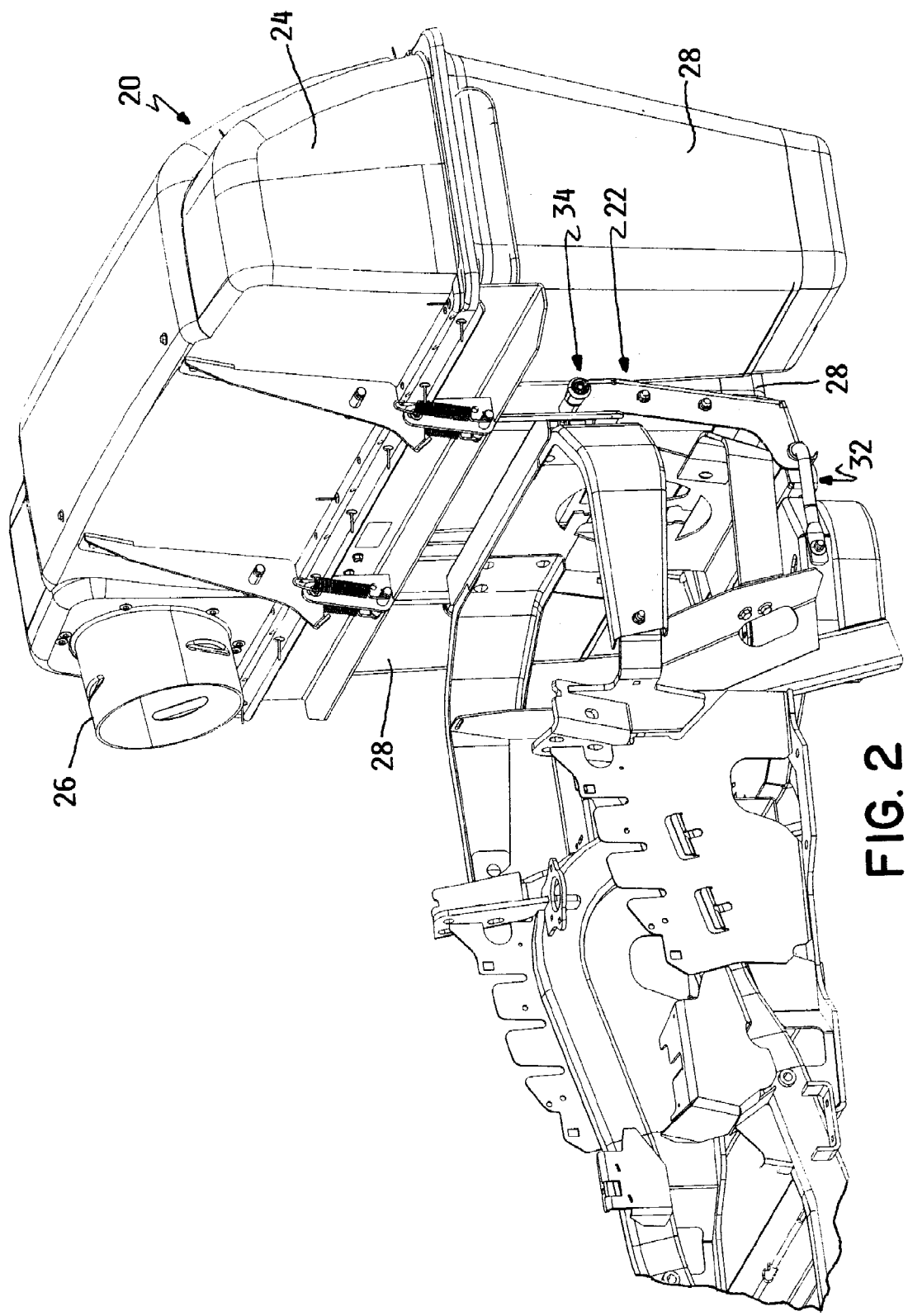
FIG. 2 is a perspective view of the grass collector mounting system of this invention installed on the rear of the frame of the mower of FIG. 1.

Referring now to FIG. 2, a grass collector 20 of generally conventional design, except for the mounting system of this invention to be described hereafter, comprises a rigid frame 22 that supports an upper, transversely extending hood 24. Hood 24 includes a short inlet pipe 26 to which the rear end of a flexible conduit or duct (not shown) may be connected. Inlet pipe 26 on hood 24 represents the inlet through which the grass clippings carried from cutting deck 4 on mower 3 are discharged into grass collector 20.

Hood 24 laterally directs the incoming grass clippings in a transverse direction such that the grass clippings flow from one side of hood 24 to the other. As the grass clippings travel in this transverse direction, they progressively fall out of hood 24 and are collected by a plurality of substantially rigid containers or substantially flexible bags 28 carried on collector frame 22 or on hood 24 and collector frame 22. Three such containers or bags 28 are shown in the drawings, though there could be more or fewer such containers or bags 28. In any event, containers or bags 28 eventually will fill with the grass clippings that are being generated by cutting deck 4 and that are being discharged into hood 24. Eventually, when the operator desires to empty grass collector 20, containers or bags 28 can be emptied or dumped in some fashion, usually by removing containers or bags 28 from beneath hood 24 and dumping them individually.

Again referring to FIG. 2, grass collector 20 as described thus far is known in the art. In addition, the term "grass collector" as used herein is meant to refer to the entire assemblage of parts just described, namely collector frame 22, transverse hood 24, and container(s) or bag(s) 28 whether there be just one container or bag or more than one container or bag.

This invention relates to a mounting system 30 that is used to couple grass collector 20 to mower 3 shown in FIG. 1 or to any other suitable mower. In performing this function, part of the structure of mounting system 30 is carried on grass collector 20 and part of the structure of mounting system 30 is carried on mower 3.

One preferred embodiment of a mounting system 30 according to this invention comprises a pivotal mount 32 between the lower portion of grass collector 20 and mower frame 6 and a quick connect fastening system 34 for operatively securing grass collector 20 to mower frame 6. In using mounting system 30, the lower portion of grass collector 20 is first pivotally mounted to mower frame 6 using pivotal mount 32 provided therefor. After the lower portion of grass collector 20 is so mounted, grass collector 20 is pivoted to a generally upright orientation in which the front of grass collector 20 generally abuts with the rear of mower frame 6. Quick connect fastening system 34 is then operated to secure grass collector 20 to mower frame 6 in this upright operative orientation.

Figure 4:
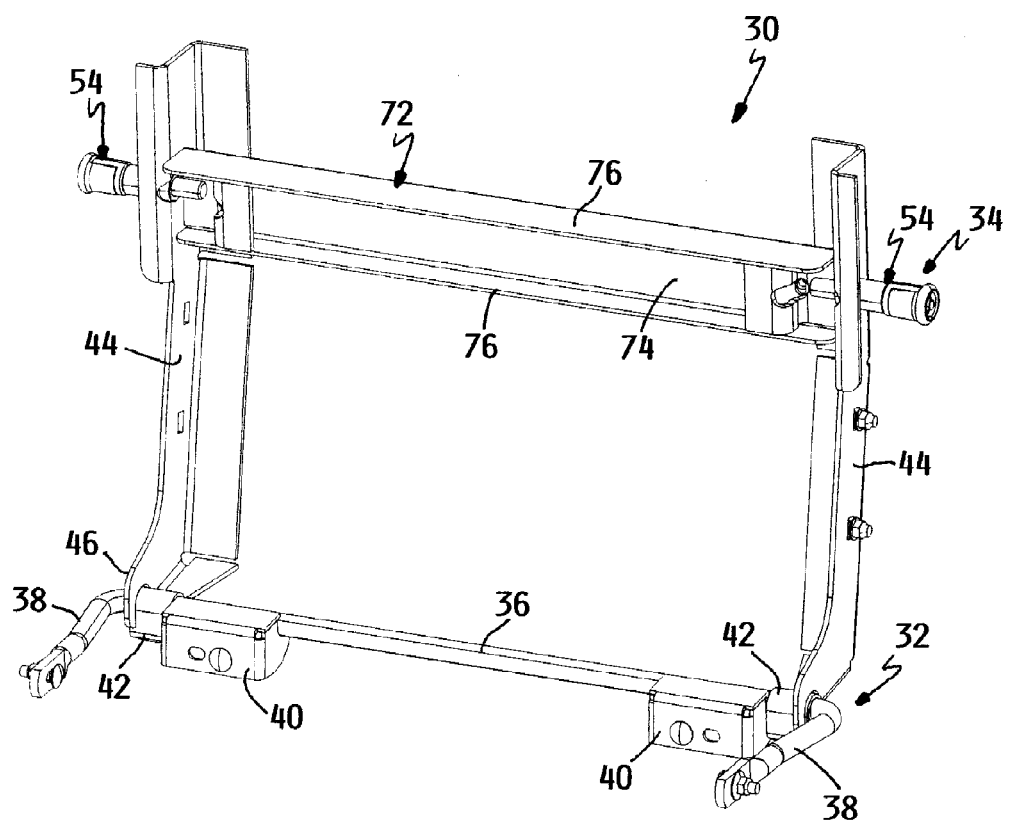
FIG. 4 is a perspective view showing only those portions of the grass collector and those portions of the frame of the mower that are needed to illustrate the grass collector mounting system of FIG. 2.

Referring to FIG. 4, pivotal mount 32 for pivotally coupling the lower portion of grass collector 20 to mower frame 6 includes a generally horizontal, transversely extending pivot bar or rod 36 that defines a horizontal, transverse pivot axis y. Pivot rod 36 is part of a U-shaped piece that includes a pair of integral forwardly extending arms 38. Arms 38 are bolted to opposite sides of mower frame 6 such that pivot rod 36 is fixed in place to mower frame 6. As shown in FIG. 2, pivotal mount 32 is attached to the bottom and rear of mower frame 6 with the transverse pivot rod 36 being closely adjacent the rear of mower frame 6. A pair of blocks 40 are carried adjacent opposite ends of pivot rod 36. Blocks 40 are used to further secure pivot rod 36 to mower frame 6 and to provide an alignment function when the lower portion of grass collector 20 is pivotally coupled to pivot rod 36. Pivot rod 36 could alternatively be formed as an integral piece of mower frame 6 rather than as a separate part bolted thereto, the shape of pivot rod 36 can differ from that shown herein as long as it provides a pivot, and pivot rod 36 could be made in separate individual sections for use with separate hooks 42 that are about to be described.

Figure 3:
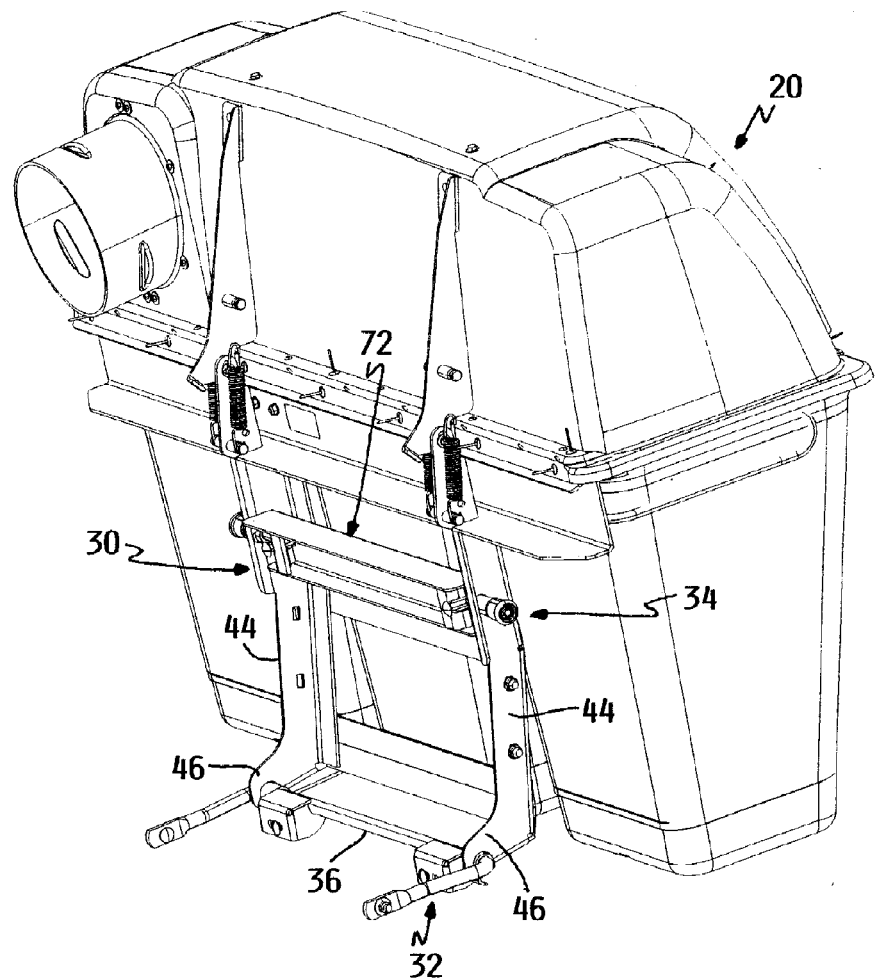
FIG. 3 is a perspective view similar to FIG. 2, but showing the frame of the mower removed to better illustrate the grass collector mounting system of FIG. 2.

Referring further to FIG. 4, the other portion of pivotal mount 32 comprises a pair of hooks 42 that can be hung on pivot rod 36 to pivotally couple grass collector 20 to mower frame 6. Hooks 42 comprise part of collector frame 22. Collector frame 22 includes a plurality of vertically extending side plates 44 as shown in FIG. 3. Various cross-members extend between and rigidly unite side plates 44 of collector frame 22. Hooks 42 that form a part of pivotal mount 32 are formed on forwardly extending flanges 46 at the bottom of side plates 44 of collector frame 22.

Figure 9:
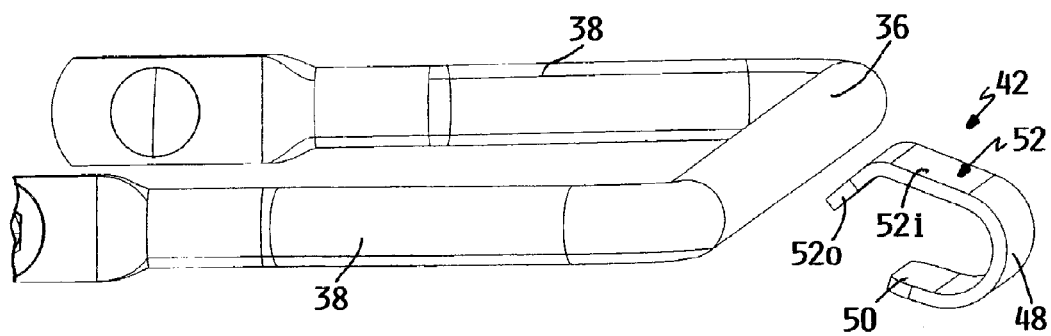
FIGS. 9-11 are perspective views showing how the lower portion of the grass collector is hung from a portion of the frame of the mower.
Figure 10:
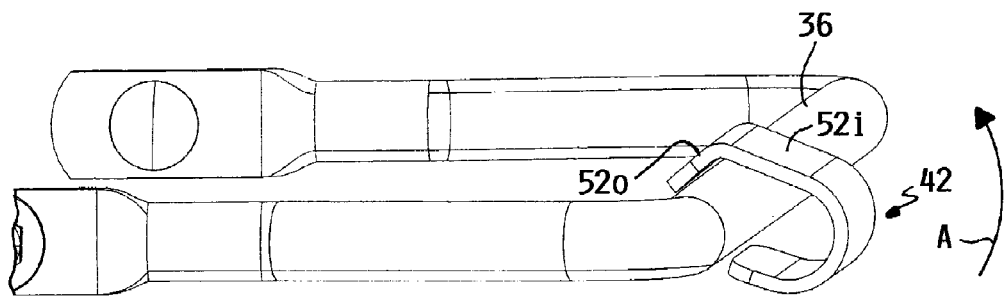
Figure 11:
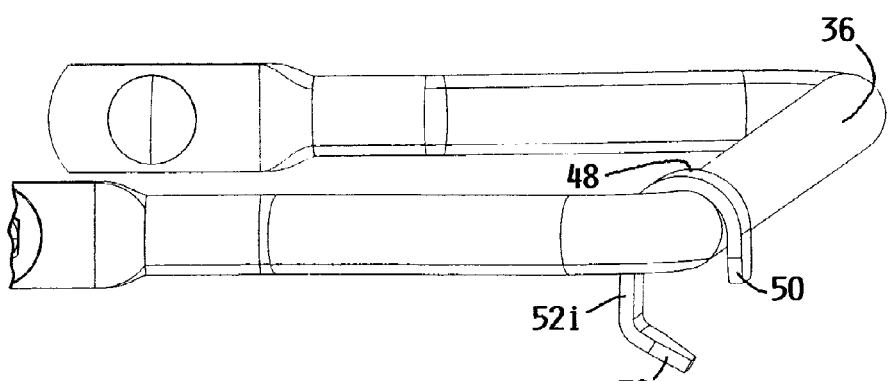

Referring now to FIGS. 9-11, hooks 42 are generally U-shaped having a semi-cylindrical base 48 with forwardly extending first and second arms 50 and 52. Arms 50 and 52 of hooks 42 are asymmetrically shaped. First arm 50 is short, flat and substantially planar. Second arm 52 includes an inner section 52i that is flat, substantially planar and generally parallel to first arm 50 with the inner section of second arm 52 being, however, substantially longer than the entire length of first arm 50. In addition, second arm 52 also includes an outer section 52o that is bent or angled downwardly relative to inner section 52i of second arm 52 to partially close off the opening to semi-cylindrical base 48. Hooks 42 are shaped in this manner to ease the task of securing the lower portion of grass collector 20 to pivot rod 36.

Referring further to FIGS. 9-11, when the operator wishes to attach the lower portion of grass collector 20 to the rear of mower frame 6, grass collector 20 will often be lying on the ground with hooks 42 of grass collector 20 generally facing forwardly in the manner shown in FIG. 9. The operator can then grip grass collector 20, lift grass collector 20 up slightly, and then move grass collector 20 forwardly until the long second arm 52 of each hook passes over the top of pivot rod 36 and the bent or angled outer portion 52o of second arm 52 catches on top of pivot rod 36 as shown in FIG. 10. In making this movement of grass collector 20, each hook 42 is designed to slip onto pivot rod 36 just outboard of each block 40 carried on opposite ends of pivot rod 36. This is the alignment function provided by blocks 40. Blocks 40 help the operator guide hooks 42 on grass collector 20 into their proper positions on pivot rod 36. See FIG. 4.

Once the operator has slid grass collector 20 so that the bent outer portions 52o of second arms 52 of each hook 42 have caught on and thus partially encircle the top of pivot rod 36, the next action in installing grass collector 20 is to lift grass collector 20 up and pivot the top of grass collector 20 forwardly towards the rear of mower frame 6. This action is represented by the arrow A in FIG. 10. As the operator does this, hooks 42 will of their own accord finish installing themselves onto pivot rod 36. In other words, hooks 42 will simply rotate around pivot rod 36 until the semi-circular base 48 of each hook rests atop pivot rod 36 and the second, longer arm 52 of each hook 42 has rotated down in front of pivot rod 36. See FIG. 11.

Now, as shown in FIG. 11, the bent outer portion 52o of second arm 52 of each hook 42 partially underlies pivot rod 36 and assists in keeping grass collector 20 attached to mower frame 6 should mower 3 be driven over bumps or the wheels on one side of mower 3 fall into a pothole. If vertical motion occurs between grass collector 20 and mower frame 6, the bent outer portion 52o of second arm 52 of each hook may engage against the bottom of pivot rod 36 in extreme motions to potentially prevent hooks 42 from completely disengaging from pivot rod 36. In addition, a separate stop described hereafter is desirably included to prevent such disengagement. However, because of the shape of hooks 42 and the fact that grass collector 20 is installed when grass collector 20 is often lying on the ground with hooks 42 facing forwardly as shown in FIG. 9, the bent outer portions 52o of hooks 42 do not provide any hindrance to hooking or coupling the lower portion of grass collector 20 to pivot rod 36. Indeed, they help facilitate this hooking or coupling by catching on pivot rod 36 to help keep grass collector 20 located on pivot rod 36 until the operator has a chance to lift grass collector 20 to its substantially upright, operative orientation.

Turning now to a description of the rest of mounting system 30 in the embodiment of the invention being disclosed herein, coupling the lower portion of grass collector 20 to mower frame 6 by hanging hooks 42 from pivot rod 36 and then rotating grass collector 20 to its substantially upright, operative orientation is only part of the process. Grass collector 20 must still be fastened to mower frame 6 in some manner to complete the mounting. This is where quick connect fastening system 34 comes in.

Quick connect fastening system 34 includes, in part, a pair of spring loaded retaining pins 54 located on opposite sides of collector frame 22. Specifically, one retaining pin 54 is carried on each side plate 44 of collector frame 22. Retaining pins 54 are identical to one another. Thus, a description of one retaining pin 54 will suffice to describe the other.

Figure 5:
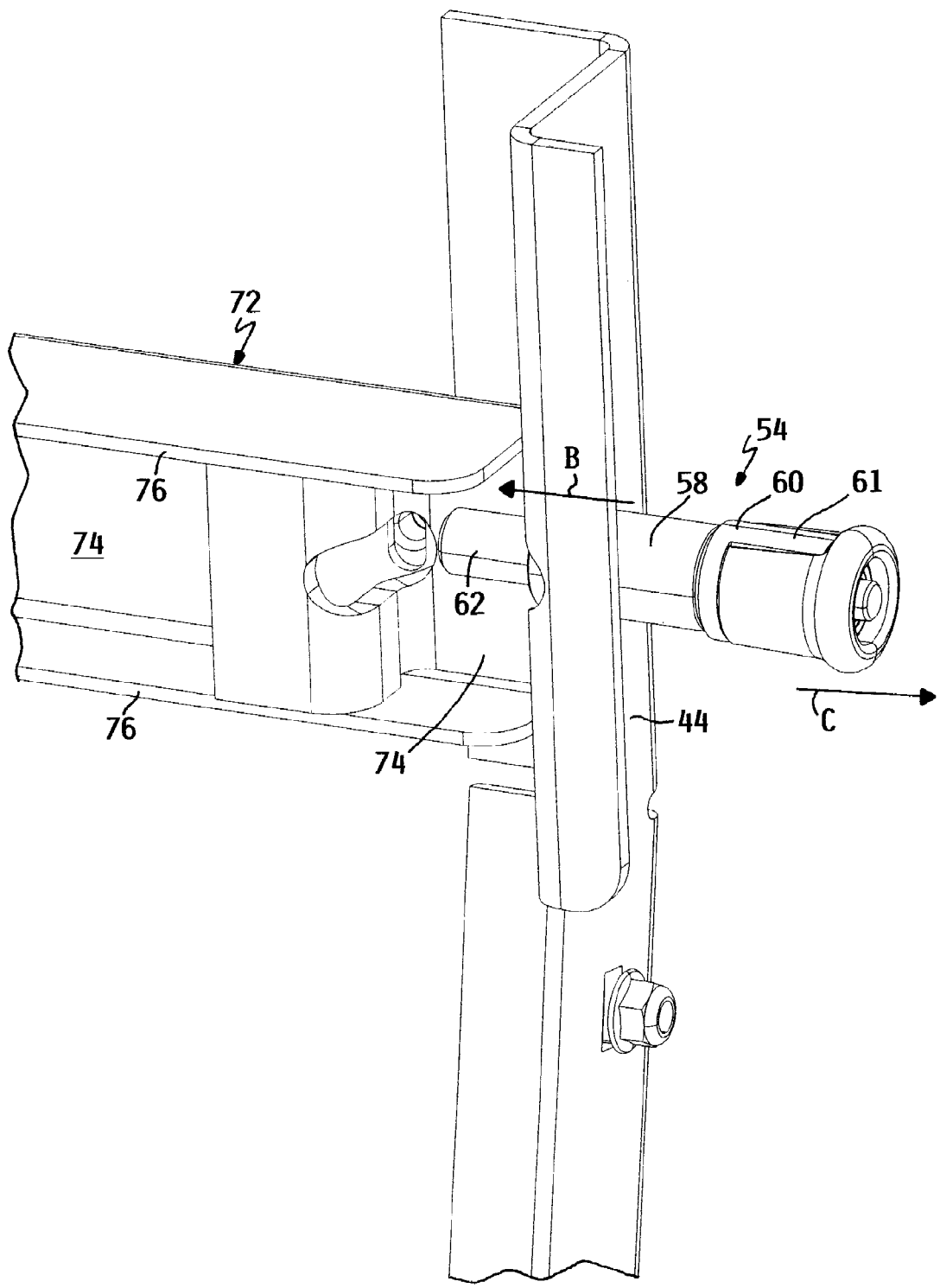
FIG. 5 is an enlarged perspective view of one of the spring biased retaining pins that forms part of the grass collector mounting system of FIG. 2.
Figure 6:
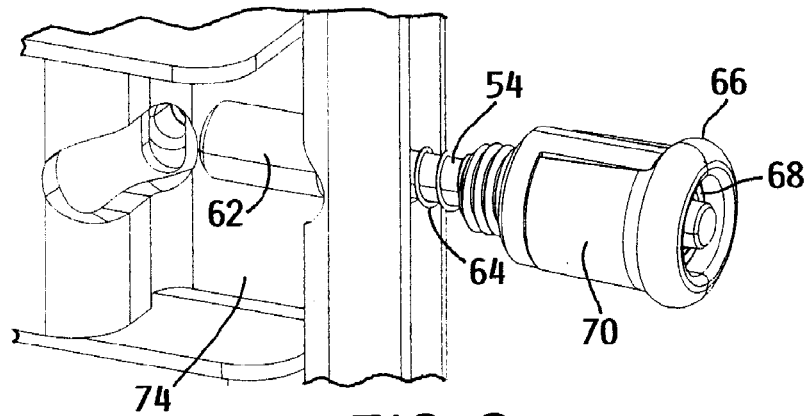
FIGS. 6-8 are perspective views similar to FIG. 5 showing various stages in the operation of the retaining pin shown in FIG. 5, but with the hub that holds the retaining pin to the collector frame having been removed to show internal components of the retaining pin.

Referring now to FIG. 5, each side plate 44 includes a mount for retaining pin 54 that includes a substantially cylindrical hub 58 affixed to side plate 44 and extending outwardly from side plate 44. Hub 58 has a bore extending therethrough. Hub 58 also has an internally threaded outer end into which a cylindrical guide member 60 is threadedly affixed. When guide member 60 is threaded into the outer end of hub 58, hub 58 and guide member 60 function as a single piece that is fixedly carried on side plate 44 of collector frame 22. Guide member 60 has a pair of slots 59 that are formed between a pair of lands 61. See FIG. 7.

Retaining pin 54 extends through the bore of hub 58 and through guide member 60 with retaining pin 54 also passing through a large hole or opening in side plate 44. Retaining pin 54 has an enlarged head 62 on the inner end thereof. A biasing spring 64 extends between head 62 of retaining pin 54 and the threaded inner end of guide member 60. Spring 64 is visible in FIGS. 6-9 since hub 58 is removed from these figures for the sake of clarity. Spring 64 tends to move retaining pin 54 inwardly relative to side plate 44 in the direction of the arrow B in FIG. 5.

A knob 66 is affixed to the outer end of retaining pin 54 by a clip 68 that is received in a groove on the outer end of retaining pin 54. When the user grips knob 66 and pulls laterally outwardly on knob 66 in the direction of the arrow C in FIG. 5, knob 66 carries retaining pin 54 with it, retracting retaining pin 54 in the direction of the arrow C and further compressing spring 64. Knob 66 has a pair of forwardly extending fingers 70 that normally fit or nest within slots 59 on guide member 60. This finger/slot interaction helps guide the movement of knob 66 and retaining pin 54.

Figure 7:
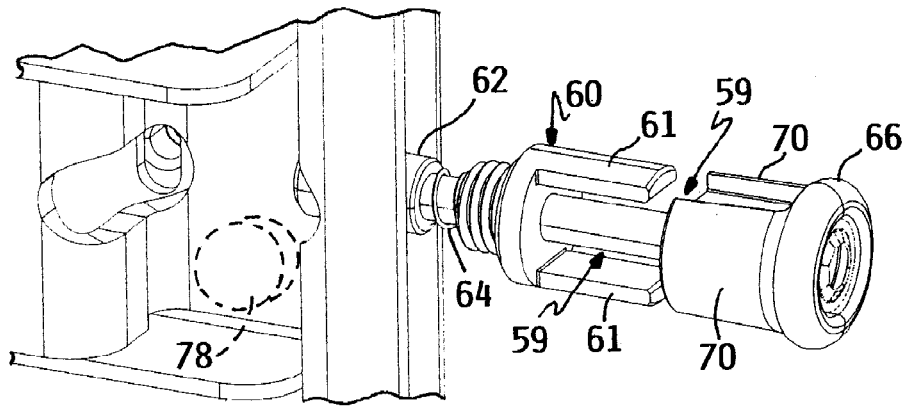
Figure 8:
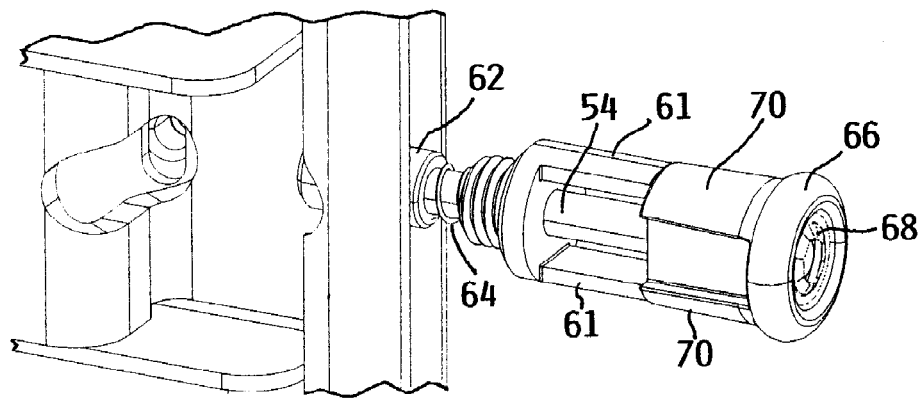

However, if the operator retracts knob 66 far enough, fingers 70 on knob 66 are able to clear or completely come out of slots 59 on guide member 60. This is shown in FIG. 7. The operator is then able to rotate knob 66 by 90° to move fingers 70 out of phase with slots 59 and into an interfering relationship with lands 61 on guide member 60. The operator can then let go of knob 66 and spring 64 will bias retaining pin 54 back in the direction of the arrow B. But, retaining pin 54 and knob 66 can go only a very short distance until fingers 70 on knob 66 engage or abut against the ends of lands 61 on guide member 60. In this position, retaining pin 54 has been temporarily latched in a retracted, non-operative position on collector frame 22. In this position, retaining pin 54 has been moved outwardly far enough that it cannot perform its grass collector fastening function.

Normally, the operator will dispose both of retaining pins 54 in their retracted, non-operative positions at some point before pivoting grass collector 20 about pivot rod 36, i.e. at some point before grass collector 20 is lifted into its substantially upright, operative position. Once the operator so lifts grass collector 20 into its substantially upright, operative position, the front of grass collector 20 including collector frame 22 will become disposed substantially adjacent to the rear of mower frame 6. In fact, side plates 44 that carry retaining pins 54 will nest around the rear of mower frame 6 with the very rear of mower frame 6 protruding into the space between side plates 44. This nesting is shown in FIGS. 2-4.

Specifically, the portion of mower frame 6 that is nested within side plates 44 comprises a transverse channel or U shaped beam 72 that is turned on its side. Beam 72 thus presents a vertical stop surface 74 that is bounded at the top and bottom by forwardly extending, horizontal lips 76. Once grass collector 20 has been lifted into its operative position, the operator can reach around and release each retaining pin 54 from its retracted, non-operative position simply by rotating knob 66 by 90° until fingers 70 on knob 66 again become aligned with slots 59 in guide member 60. Then, spring 64 is free to relieve the compression thereon by automatically moving retaining pin 54 back in the direction of the arrow B. As it does so, the inner end of retaining pin 54 moves laterally from a position in which it is clear of stop surface 74 when retaining pin 54 was in its retracted, non-operative position to a position in which the inner end of retaining pin 54 lies ahead of or in front of stop surface 74 on beam 72. In this position of retaining pin 54, namely in an extended, operative position, retaining pin 54 prevents grass collector 20 from rotating back around pivot rod 36 and secures or fastens grass collector 20 to mower frame 6.

The use of a member or beam 72 with a relatively long vertical stop surface in relation to the height or diameter of retaining pin 54 is advantageous because it relieves the operator of the need to align retaining pin 54 with some type of circular hole on mower frame 6. All retaining pin 54 has to do is to engage something on mower frame 6 to prevent reverse rotation of grass collector 20 on mower frame 6. This can be done simply by having retaining pin 54 engage or abut against an extended surface on mower frame 6. Since precise alignment of retaining pin 54 with a hole is no longer required, manufacturing tolerances become less important and retaining pins 54 are still able to function with parts falling within a wide range of manufacturing tolerances. In addition, even if grass collector 20 sags to one side or the other, retaining pins 54 can still easily engage against the extended vertical stop surface 74 presented by the transverse beam 72 on mower frame 6.

Mounting system 30 of this invention allows an operator to quickly mount or dismount grass collector 20 from mower 3. The operator can first retract retaining pin 54 on grass collector 20 and place them into their retracted, non-operative positions. The operator can then easily and quickly hook or hang the lower portion of grass collector 20 on pivot rod 36 simply by lifting grass collector 20 and moving it forwardly until the longer second arms 52 of the pair of hooks 42 catch atop pivot rod 36. Then, the operator lifts grass collector 20 upwardly to pivot grass collector 20 about pivot rod 36 and in doing so the two hooks 42 will naturally drop or settle down further onto pivot rod 36 with the longer second arms 52 of hooks 42 pivoting around pivot rod 36 until the outer portions 52o of second arms 52 of hooks 42 now underlie pivot rod 36. Finally, the operator releases each of the two retaining pins from their retracted positions simply by rotating knobs 66 by 90°. Retaining pins 54 then snap into their extended operative positions under the influence of their biasing springs 64 with retaining pins 54 simply moving adjacent to or abutting against stop surface 74 of beam 72 on mower frame 6. Thus, the mounting of grass collector 20 to mower 3 is completed.

If desired, a small compressible rubber pad or bumper, shown in phantom as 78 in FIG. 7, could be placed at the interface between stop surface 74 of beam 72 and that portion of collector frame 22 that abuts with or engages against stop surface 74 when grass collector 20 is in its substantially upright, operative position. As shown by the dotted line representation of rubber bumper 78 in FIG. 7, rubber bumper 78 is placed on the backside of vertical stop surface 74 (the side opposite the front side against which retaining pins 54 engage). While only one rubber bumper 78 is shown in FIG. 7 on one side of collector frame 22, a similarly located rubber bumper 78 is present on the opposite side of collector frame 22.

When collector frame 22 is rotated up into its operative position, rubber bumpers 78 will be engaged just before the conclusion of this operation at a point before retaining pins 54 get fully past stop surface 74. If the operator were to release retaining pins 54 in this position, the inner end of retaining pins 54 would hit against the side edges of stop surface 74 and not be able to slide in front of stop surface 74. But, all the operator has to do is to push slightly forwardly on grass collector 20 to compress rubber bumpers 78 enough that retaining pins 54 finally clear stop surface 74. At this point, with retaining pins 54 having been earlier released, springs 64 will immediately force retaining pins 54 inwardly into an abutting engagement with stop surface 74.

Rubber bumpers 78 could be used or not used and mounting system 30 would still function to mount grass collector 20 on mower 3. However, use of rubber bumpers 78 is preferred since their presence does two things. They first ensure that retaining pins 54 when engaged with stop surface 74 will actually lie against stop surface 74 rather than being spaced away from stop surface 74. This removes potential slop or play in the mounting, thus reducing rattling and noise issues. In addition, bumpers 78 further serve to deaden and absorb other potential motion between grass collector 20 and mower frame 6, thus further reducing rattling and noise.

As is apparent, when grass collector 20 is placed into its substantially upright, operative position, some vertical motion is permitted by hooks 42 that can move vertically relative to pivot rod 36 and by retaining pins 54 that can slide along stop surface 74. To prevent grass collector 20 from disengaging from mower frame 6, a stop is preferably included to limit the permitted vertical motion of grass collector 20 to an amount that prevents hooks 42 from disengaging pivot rod 36. This can be conveniently done by providing some type of stop (not shown) on collector frame 22 that would abut with some portion of mower frame 4 before short arm 50 of hook 42 passes above pivot rod 36. For example, each rubber bumper 78 could be mounted on the vertical leg of an L-shaped flange (not shown) on each side of collector frame 22. The horizontal leg of this L-shaped flange would normally extend or stick out vertically below the lower edge of stop surface 74. Thus, if grass collector 20 rises relative to the mower 3, the horizontal leg of the L-shaped flange that attaches rubber bumper 78 to collector frame 22 would abut against the lower edge of stop surface 74 to prevent further vertical motion before hook 42 unhooks itself from pivot rod 36.

Mounting system 30 of this invention is simple and durable. It features a pivotal mount 32 that allows a bottom portion of grass collector 20 to be pivotally hung on mower 3 without requiring the use of any fasteners. It further features a quick connect fastening system 34 comprising spring biased retaining pins 54 that move into an operative fastening position without having to be threaded or aligned with fastening holes.

Various modifications of this invention will be apparent to those skilled in the art. Only a preferred embodiment of this invention has been shown and described herein and other embodiments of the invention are possible. Thus, the scope of this invention is to be limited only by the appended claims.

I claim:

1. An improved riding mower with a grass collector of the type in which the mower has a mower frame, a plurality of wheels for supporting the mower frame for movement over the ground, a cutting deck having at least one rotary blade for cutting grass and generating grass clippings, and a prime mover for powering at least one of the wheels and the at least one rotary blade, and in which the grass collector comprises a grass collector frame, an upper hood for receiving grass clippings from the cutting deck, and at least one container or bag carried beneath the upper hood for receiving the grass clippings from the upper hood, and a mounting system for detachably mounting the grass collector to the mower, wherein the improvement relates to the mounting system and comprises:
    (a) a pivotal mount for pivotally mounting a lower portion of the grass collector on the mower frame, wherein the pivotal mount comprises a hook and pivot arrangement by which the lower portion of the grass collector is hung by at least one hook on a pivot;
    (b) a quick connect fastening system for securing the grass collector to the mower frame in a substantially upright, operative position after the lower portion of the grass collector is first installed on the mower frame using the pivotal mount and after the grass collector is rotated in a first direction around the pivot into the substantially upright, operative position, wherein the quick connect fastening system comprises at least one retaining pin that slides between a retracted, non-operative position and an extended, operative position, wherein the at least one retaining pin in the extended, operative position thereof has a portion thereof abutting against a planar stop surface on the mower frame to prevent the grass collector from reversely rotating about the pivot out of its substantially upright, operative position, and wherein the planar stop surface has a planar extent that is substantially larger than the abutting portion of the at least one retaining pin such that precise vertical alignment of the retaining pin relative to the planar stop surface is not required; and
    (c) a compressible pad or bumper between the mower frame and the grass collector that is engaged by the grass collector as the grass collector approaches the substantially upright, operative position thereof, wherein the pad or bumper must be at least partially compressed in order to allow the at least one retaining pin on the grass collector to move into an abutting engagement against the planar stop surface such that the compression of the pad or bumper keeps the at least one retaining pin substantially snugly abutted against the stop surface to minimize rattling of the grass collector against the mower frame.

2. The mower of claim 1, wherein the retaining pin is spring biased to slide towards its extended, operative position.

3. A mower, which comprises:
    (a) a mower frame supported for movement over the ground;
    (b) a grass collector;
    (c) a mounting system for coupling the grass collector to the mower frame, wherein the mounting system comprises:
        (i) a pivotal mount that pivotally couples a lower portion of the grass collector to the mower frame, wherein the pivotal mount comprises a hook that includes a semi-circular portion that hangs from a circular pivot rod, the semi-circular portion of the hook having opposite ends;
        (ii) at least one retaining pin for securing the grass collector to the mower frame in a substantially upright, operative position after the lower portion of the grass collector is first installed on the mower frame using the pivotal mount and after the grass collector is rotated in a first direction around the pivot rod into the substantially upright, operative position; and
        (iii) wherein the hook includes an arm that extends outwardly from one end of the semi-circular portion of the hook, wherein the arm has a said bend located between inner and outer sections thereof which said bend is separate and distinct from the semi-circular portion of the hook and which bend faces downwardly when the semi-circular portion of the hook faces generally forwardly, wherein the hook can be initially hooked onto the pivot rod by manipulating the grass collector to face the semi-circular portion of the hook generally forwardly with the arm being positioned to pass over the pivot rod and by moving the hook towards the pivot rod until the downwardly facing bend in the arm catches on to of the pivot rod to loosely retain the hook on the pivot rod, and wherein the hook can be further hooked onto the pivot rod when the operator lifts the grass collector which action rotates the hook around the pivot rod until the semi-circular portion of the hook seats on to of the pivot rod with the bend in the arm having disengaged from the top of the pivot rod to thereby more firmly retain the hook on the pivot rod when the grass collector has been placed into the substantially upright, operative position thereof.

4. The mower of claim 3, wherein the hook is generally U-shaped further having a substantially straight arm extending from the other end of the semi-circular portion of the hook, and wherein the straight arm is shorter than the bend-containing arm.

5. The mower of claim 4, wherein the bend in the bend-containing arm forms an obtuse angle between the inner and outer sections thereof.

6. The mower of claim 3, wherein the bend in the bend-containing arm is located beneath the pivot rod and the outer section of the bend-containing arm at least partially underlies the pivot rod and is spaced beneath the pivot rod by a gap when the grass collector is placed into the substantially upright, operative position thereof to permit vertical motion between the grass collector and the mower frame over the gap's height when the grass collector is in the substantially upright, operative position.

* * * * *

UNITED STATES PATENT AND TRADEMARK OFFICE
CERTIFICATE OF CORRECTION

Page 1 of 1

PATENT NO.       : 7,908,837 B2
APPLICATION NO.  : 12/151588
DATED            : March 22, 2011
INVENTOR(S)      : Kermit A. Wolff It is certified that error appears in the above-identified patent and that said Letters Patent is hereby corrected as shown below:

Col. 10, Line 49, change "a said bend" to --a bend--;
Col. 10, Line 52, change "which bend" to --which said bend--;
Col. 10, Lines 60 and 65, change "on to of" to --on top of--.

Signed and Sealed this
Twenty-fifth Day of October, 2011

David J. Kappos
*Director of the United States Patent and Trademark Office*